(12) United States Patent
Lee et al.

(10) Patent No.: US 6,335,148 B2
(45) Date of Patent: Jan. 1, 2002

(54) METHOD FOR MANUFACTURING TFT LCD DEVICE

(75) Inventors: Seok Lyul Lee, Kyoungki-do; Jung Mok Jun; Seung Min Lee, both of Seoul, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/740,497

(22) Filed: Dec. 19, 2000

(30) Foreign Application Priority Data

Dec. 29, 1999 (KR) .............................. 99-64383

(51) Int. Cl.[7] .......................... G03F 7/00; G02F 1/1362

(52) U.S. Cl. ...................... 430/316; 430/319; 430/396; 430/318; 438/30

(58) Field of Search ................................ 430/316, 317, 430/318, 319, 321, 396; 438/30

(56) References Cited

U.S. PATENT DOCUMENTS 4,231,811 A * 11/1980 Somekh et al. .............. 148/1.5
6,255,130 B1 * 7/2001 Kim et al. .................... 438/30
2001/0007779 * 7/2001 Lee et al. .................... 438/30

* cited by examiner

Primary Examiner—John A. McPherson
(74) Attorney, Agent, or Firm—Ladas & Parry

(57) ABSTRACT

Disclosed is a method for manufacturing a thin film transistor LCD device, in which a counter and a gate bus line are made in a single photolithography process, and a channel of a thin film transistor, a source electrode, a drain electrode, ohmic contacts for the source and drain electrodes are made in a single photolithography process. The method involves the steps of forming a first photoresist layer on said deposited metal layer for the gate bus line; exposing said first photoresist layer to a scanning light, so that the portion of the first photoresist layer disposed over a counter electrode region for forming said counter electrode may be partially lightened; patterning said first photoresist layer so that an area of the metal layer for the gate bus line lying under the partially lightened portion of the first photoresist layer may not be exposed; patterning said metal layer for the gate bus line by using said patterned first photoresist layer as a barrier layer so that said counter electrode region and a gate bus line region may be defined; patterning said transparent conductive layer for the counter electrode by using said patterned metal layer as a barrier layer so that said counter electrode may be formed; patterning said metal layer for the gate bus line by using said patterned first photoresist layer as a barrier layer so that said gate bus line may be formed.

9 Claims, 8 Drawing Sheets

METHOD FOR MANUFACTURING TFT LCD DEVICE

BACKGROUND OF THE INVENTION

1. Field of the Invention

The present invention relates to a thin film transistor (TFT) liquid crystal display (LCD) device and more particularly, to a TFT LCD device having a pixel electrode and a counter electrode so configured that an electric field having a horizontal component parallel to the surface of a back substrate is generated in a liquid crystal cell.

2. Description of the Related Art

In general, a TFT LCD device comprises a plurality of unit pixels and thin film transistors respectively corresponding to the unit pixels. Due to such a construction, it can realize a fast responding property, a high picture quality comparable to cathode ray tubes (CRTs), and an enlargement in scale of screen.

At an early stage of the development of such TFT LCD devices, a TN (Twisted Nematic) mode or STN (Super Twisted Nematic) mode has been proposed, in which an electric field perpendicular to the surface of a back substrate is applied to liquid crystal cells. However, TN or STN mode LCD devices have a drawback of a poor viewing angle property. In order to overcome this drawback, an in plane switching (IPS) mode LCD device has been proposed.

In this IPS mode liquid crystal display device, an electric field parallel to the surface of the back substrate is applied to liquid crystal cells. In order to generate such a parallel electric field, a pixel electrode and a counter electrode are arranged in parallel to each other on the back substrate. In this IPS mode LCD device, a viewing angle property can be improved. However, the in plane switching mode LCD device, in which the pixel electrodes and counter electrodes are made of an opaque conductive material, exhibits a low aperture ratio and a degraded transmittance. In order to solve this problem, a fringe field switching mode LCD device has also been proposed (Korean Patent Application No. 98-9243).

The above-mentioned fringe field mode LCD device is illustrated in FIG. 1. FIG. 1 is a plan view illustrating a conventional fringe field mode LCD device manufactured according to the conventional method.

As shown in FIG. 1, in the fringe field mode LCD device a plurality of unit pixels are defined by gate bus lines 2 and data bus lines 4 which are arranged in a matrix form on a back substrate 1. Further, a thin film transistor is disposed in the vicinity of an intersection where one gate bus line 2 and one data bus line 4 cross each other.

In each unit pixel, a counter electrode 5 is formed in the shape of a rectangular plate. The counter electrode 5 is made of a transparent conductive material and is connected to storage capacitor line 7 so as to receive common signals continuously. The storage capacitor line 7 has a first storage capacitor 7a extending in parallel to the gate bus line 2, and a second storage capacitor 7b extending from the first storage capacitor 7a in parallel to the data bus line 4 so that it may be interposed between the counter electrode 5 and the data bus line 4. The first storage capacitor 7a is electrically in contact with the counter electrode 5 whereas the second storage capacitor 7b is electrically insulated from the data bus line 4.

Also in each unit pixel, a pixel electrode 9 is also provided, which is made of a transparent conductive material. The pixel electrode 9 overlaps partially with the counter electrode 5, and is insulated from the counter electrode 5 by a gate insulating film (not shown). The pixel electrode 9 has a plurality of comb-shaped electrode portions 9a, and an electrode bar 9b for connecting respective end of the comb-shaped electrode portions 9a together. The comb-shaped electrode portions 9a are uniformly spaced from one another.

The electrode bar 9b is in contact with a drain electrode of the thin film transistor.

Since both the pixel electrode 5 and the counter electrode 9 are made of a transparent conductive material, high aperture ratio can be realized.

Meanwhile, although not shown, a front substrate is disposed opposite to the back substrate 1. The spacing between the front substrate and back substrate 1 is greater than the spacing between the counter electrode 5 and the pixel electrode 9.

Now, the operation of the fringe field mode LCD device having the above construction will be described.

When a voltage is exerted between the counter electrode 5 and the pixel electrode 9, a fringe field is produced in the liquid cell. Here, since the spacing between the front substrate and back substrate 1 is set to be greater than the spacing between the counter electrode 5 and the pixel electrode 9, a fringe field having a vertical component is generated over the entire upper surface of two electrodes, that is, the counter electrode 5 and the pixel electrode 9. Therefore, liquid crystal molecules over the two electrodes are activated. Thus, a high transmittance is achieved.

A conventional method for manufacturing the fringe field mode LCD device operating as above will be described referring to FIG. 2. FIG. 2 is a cross sectional view illustrating the conventional method for manufacturing the fringe field mode LCD device.

A transparent conductive layer is formed on a back substrate 10, and so patterned according to a first photolithography process that a counter electrode 11 is formed.

A metal layer for a gate bus line is formed on the back substrate 10 where the counter electrode 11 has been formed. Then, though not shown, a gate bus line, a common electrode line and a gate pad are simultaneously formed by a second photolithography process. Here, the gate bus line extends in one direction. The common electrode line is in contact with the counter electrode 11, and the gate pad is located at the edge of the back substrate 10.

A gate insulating layer 12, an amorphous silicon layer for a channel (not shown) and a doped semiconductor layer for an ohmic contact (not shown) are sequentially formed on the back substrate 10 where the gate bus line and the like have been formed. The doped semiconductor layer and amorphous silicon layer are so patterned according to a third photolithography process that a thin film transistor area is defined.

A metal layer for a data bus line is formed on the back substrate 10 where the thin film transistor area has defined. Then, a source electrode, a drain electrode, a data bus line and a data pad, which are not shown in the figure, are formed according to a fourth photolithography process. Here, the source electrode and the drain electrode are formed in the thin film transistor area. The data bus line is arranged to cross the gate bus line, and the data pad overlaps partially with the gate pad.

A protecting layer 13 is formed on the back substrate 10 where the source electrode and so on have been formed. Then, the protecting layer is so patterned according to the fifth photolithography process that a part of the drain electrode, the data pad and the gate pad are exposed.

Finally, a transparent conductive layer is formed so as to contact with the exposed portion of the drain electrode, the data pad and the gate pad on the protecting layer 13. Then, according to a sixth photolithography process the transparent conductive layer is so patterned that a comb-shaped pixel electrode 14 is formed.

In FIG. 2, the reference number 15 represents a back orientation film disposed on the pixel electrode 14 and protecting layer 13, the reference number 20 represents a front substrate opposite to the back substrate 10, the reference number 21 represents a front orientation film disposed on the back surface of the front substrate 20, the reference number 22 represents liquid crystals filled between the two substrates 10 and 20, and the reference characters E1 and E2 represent fringe fields generated between the counter electrode 11 and the pixel electrode 14, respectively.

However, each of the above 6 photolithography processes involves many sub-processes, such as a resist coating process, an exposing process, a developing process, an etching process, a resist removing process and the like. Further, it is required to prepare a different photo mask for every photolithography process. Therefore, in order to reduce the manufacturing costs while increasing the production yield, there is a necessity for reducing the number of the photolithography processes.

SUMMARY OF THE INVENTION

Therefore, an object of the invention is to provide a method for manufacturing a thin film transistor LCD device in which the number of photolithography processes used is reduced in order to solve the above-mentioned problem involved in the related art.

A present method for manufacturing a thin film transistor LCD device having a back substrate, a front substrate opposed to said back substrate, a liquid crystal cell interposed between the front and back substrates, a pixel electrode formed on the back substrate, a counter electrode formed on the back substrate and adapted to cooperate with the pixel electrode to generate an electric field having a horizontal component parallel to a surface of the back substrate, and a thin film transistor including a gate electrode, a source electrode, and a drain electrode, the thin film transistor serving to apply an image signal voltage between said pixel electrode and said counter electrode, comprising the steps of:

a transparent conductive layer for the counter electrode and a metal layer for the gate bus line on the back substrate sequentially deposited. Thereafter, a first photoresist layer is formed on said deposited metal layer for the gate bus line; Thereafter, said first photoresist layer is so exposed to a scanning light that the portion of the first photoresist layer disposed over a counter electrode region for forming said counter electrode is partially lightened; Thereafter, said first photoresist layer is so patterned that an area of the metal layer for the gate bus line lying under the partially lightened portion of the first photoresist layer is not exposed; Thereafter, said metal layer for the gate bus line is so patterned by using said patterned first photoresist layer as a barrier layer that said counter electrode region and a gate bus line region may are defined; Thereafter, said transparent conductive layer for the counter electrode is so patterned by using said patterned metal layer as a barrier layer that said counter electrode is formed; Thereafter, said metal layer for the gate bus line is so patterned by using said patterned first photoresist layer as a barrier layer that said gate bus line is formed; Thereafter, the thin film transistor is formed on said back substrate where said gate bus line has been formed; Thereafter, a protecting layer is formed on said back substrate where said thin film transistor has been formed; Thereafter, said protecting layer is so patterned that a part of the drain electrode included in said thin film transistor is exposed; Thereafter, a transparent conductive layer for the pixel electrode is formed on said back substrate where said drain electrode has been exposed; and said transparent conductive layer for the pixel electrode is so patterned that said pixel electrode is formed.

At the step of exposing the first photoresist layer to the scanning light, the first photoresist layer over the counter electrode is partially exposed to a scanning light by using a first photo mask a portion of which corresponding to the area of said first photoresist layer located over the counter electrode region has opening parts and closed parts arranged in a lattice form.

Further, in order to form a gate pad and a data pad simultaneously, the step of exposing said photoresist layer to the scanning light may be carried out by exposing said first photoresist layer to the scanning light so that a data pad region and a gate pad region for forming a data pad and a gate pad respectively may be defined at the edges of the back substrate; the step of patterning said metal layer for the gate bus line may be carried out by patterning said metal layer so that the data pad and the gate pad may be formed simultaneously with the gate bus line; the step of patterning said protecting layer may be carried out by patterning the protecting layer so that the data pad and the gate pad may be exposed; and the step of forming said transparent conductive layer for the pixel electrode comprises may be carried out by forming the transparent conductive layer for the pixel electrode so as to contact with the exposed data pad and gate pad.

Further, in order to reduce the number of photolithography processes used, the step of forming the thin film transistor may be carried out by the following procedures.

A gate insulating layer, an amorphous silicon layer for a channel, a doped semiconductor layer for an ohmic contact, and a metal layer for source/drain electrodes are sequentially deposed on the back substrate where said counter electrode and said gate bus line have been formed; Thereafter, a second photoresist layer is formed on said deposited metal layer for source/drain electrodes; Thereafter, said second photoresist layer is so exposed to a scanning light that the portion of said second photoresist layer lying over an area of the metal layer for source/drain electrodes defined between a source electrode region for forming the source electrode and a drain electrode region for forming the drain electrode is partially lightened; Thereafter, said second photoresist layer is so patterned that the area of the metal layer for source/drain electrodes lying under the partially lightened portion of said second photoresist layer is not exposed; Thereafter, said metal layer for source/drain electrodes is so patterned by using said patterned second photoresist layer as a barrier layer that said source electrode region and said drain electrode region are defined; Thereafter, said doped semiconductor layer for the ohmic contact is patterned by using said patterned metal layer as a barrier layer that an ohmic contact region for forming ohmic contacts for the source electrode and the drain electrode are defined; Thereafter, said amorphous silicon layer for the channel is so patterned by using said patterned doped semiconductor as a barrier layer that a channel of the thin film transistor is formed; Thereafter, said metal layer for source/drain electrodes is so patterned by using said patterned second photoresist layer as a barrier layer that the source electrode and drain electrode are formed; and said doped semiconductor layer for the ohmic contact is so patterned by using said source electrode and the drain electrode as barrier layers that the ohmic contacts of the source electrode and the drain electrode are formed.

BRIEF DESCRIPTION OF THE DRAWINGS

The above objects, and other features and advantages of the present invention will become more apparent after a reading of the following detailed description in conjunction with the drawings, in which.

DESCRIPTION OF THE PREFERRED EMBODIMENTS

Now, preferred embodiments of the present invention will be described in conjunction with the annexed drawings.

Figure 3:
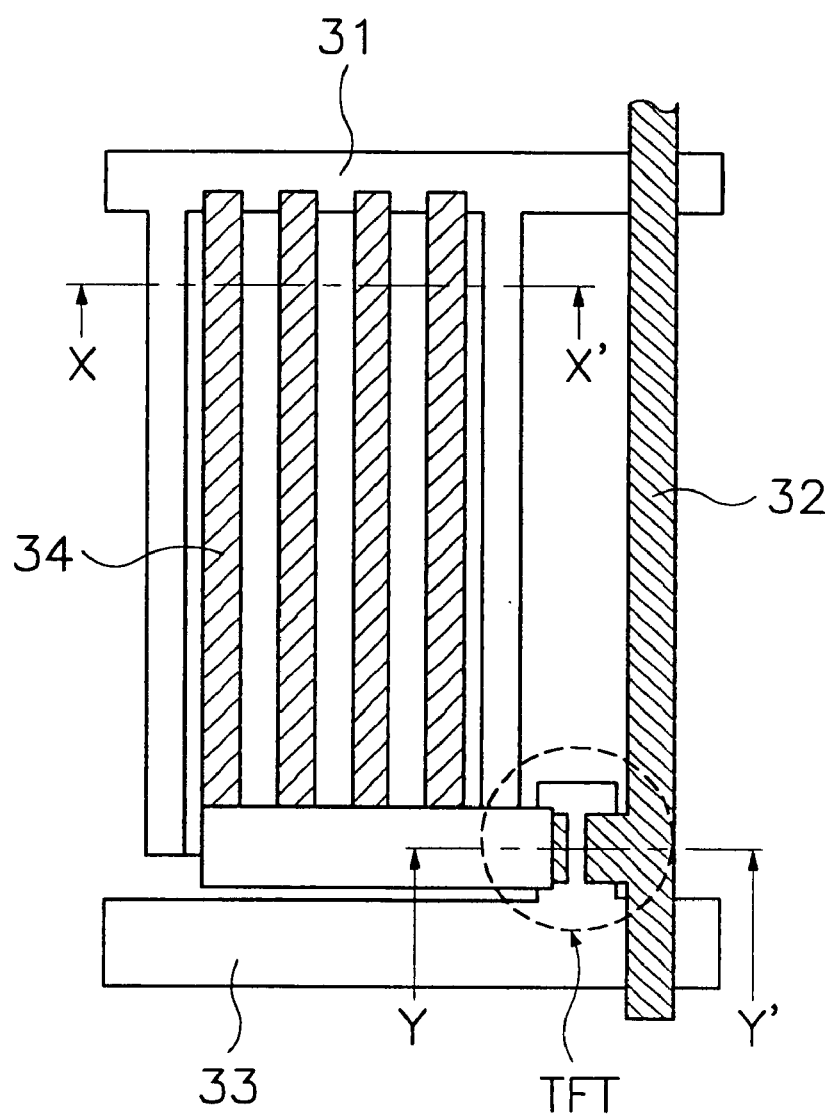
FIG. 3 is a schematic plan view illustrating a method for manufacturing a fringe field mode LCD device according to an embodiment of the present invention.

FIG. 3 is a plan view schematically illustrating a fringe field mode LCD according to an embodiment of the present invention.

As shown in FIG. 3, in the fringe field mode LCD according to the illustrated embodiment of the present invention a unit pixel is defined by gate bus lines 33 and data bus lines 32 arranged on a back substrate in a matrix form. In the vicinity of an intersection where one gate bus line 33 and one data bus line 32 cross each other, a thin film transistor is arranged.

In each of the defined unit pixels a pixel electrode 34 is formed so as to overlap with a counter electrode. A common voltage is applied to the pixel electrode 34 via a common electrode line 31.

Figure 1:
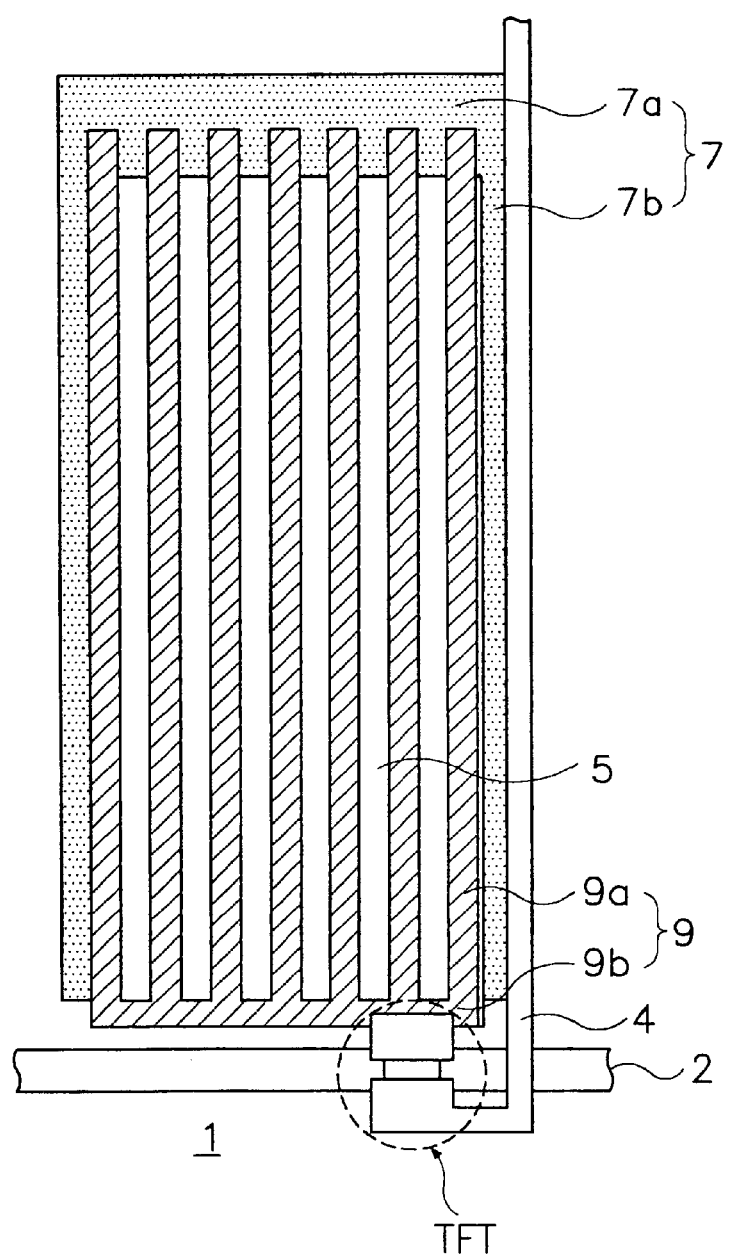
FIG. 1 is a plan view illustrating a conventional fringe field mode LCD device manufactured according to the conventional method.
Figure 2:
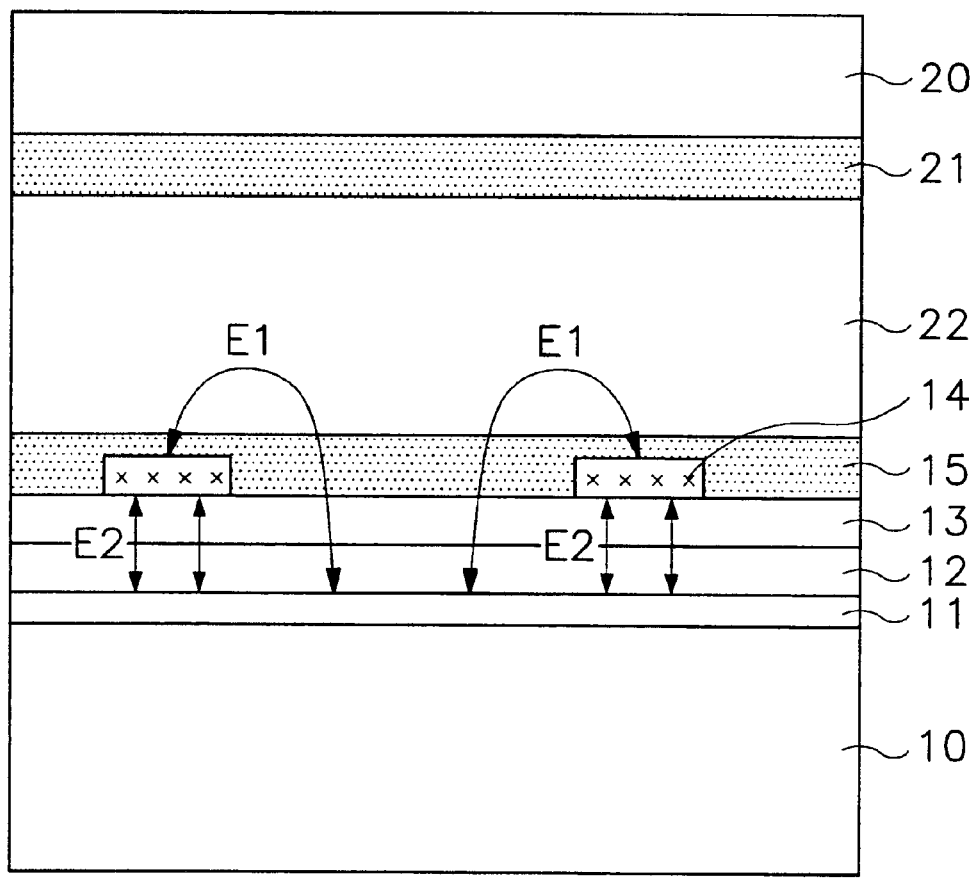
FIG. 2 is a cross-sectional view illustrating a conventional method for manufacturing the fringe field mode LCD device.

The fringe field mode LCD device having such a construction has the same operation mechanism as the fringe field mode LCD device illustrated in FIG. 1, and the manufacturing method thereof is illustrated in FIGS. 4a to 4e, FIGS. 5a to 5e, FIG. 6 and FIG. 7. FIGS. 4a to 4e are cross-sectional views taken along a line X–X' of FIG. 3, respectively, and FIGS. 5a to 5e, FIG. 6 and FIG. 7 are cross-sectional views taken along a line Y–Y' of FIG. 3, respectively.

With reference to FIGS. 4a to 4e, the first photolithography process of the method for manufacturing the fringe field mode LCD device according to the embodiment of the present invention is described. For the convenience of the explanation, a back substrate 41 is divided into three parts, that is, a gate electrode part A where a gate bus line is to be formed, a counter electrode part B where a counter electrode is to be formed, and a storage capacitor electrode part C where a storage capacitor electrode is to be formed. Also, it is assumed that photoresist layers used are of a positive type.

First, a transparent conductive layer 42 for a counter electrode and a metal layer 43 for a gate bus line are deposited sequentially on the back substrate 41. For the metal layer 43, a metal is used which can be etched by the dry etching method, such as Ta, $Mo_xTa_y$, $Mo_xW_y$ and so on.

Figure 4A:
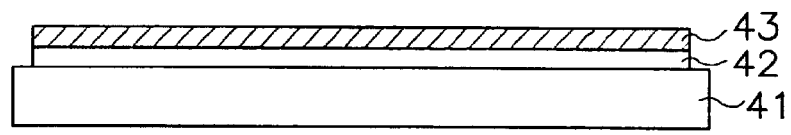
FIGS. 4a to 4e are cross-sectional views respectively illustrating a first photolithography process involved in the method for manufacturing the fringe field mode LCD device according to an embodiment of the present invention.
Figure 4B:
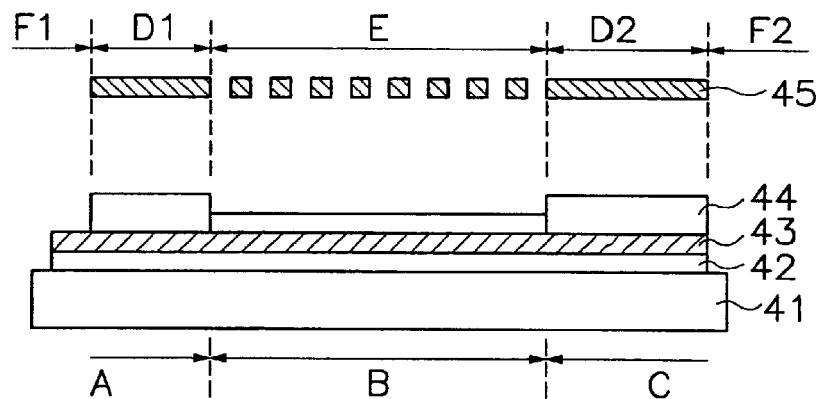

A first photoresist layer 44 is coated on the metal layer 43, and then an exposing process is carried out using a first photo mask. As shown in FIG. 4b, the first photo mask 45 has a D1 region corresponding to the gate electrode part A of the back substrate 41, a D2 region corresponding to the storage capacitor electrode part C of the back substrate 41, an E region corresponding to the counter electrode part B of the back substrate 41, and F1 and F2 regions located outside the D1 and D2 regions, respectively. Here, the D1 and D2 regions are shielded so as to prevent a scanning light from transmitting therethrough. On the other hand, the F1 and F2 regions are open so as to allow a scanning light to transmit therethrough.

The E region has a plurality of opening parts allowing a scanning light to pass therethrough, and a plurality of closed parts preventing the scanning light from passing therethrough.

The opening parts and closed parts are arranged in a lattice form.

Upon developing the first photoresist layer 44 exposed to a scanning light by using the first photo mask 45 having the above mentioned arrangement, the areas of the photoresist layer respectively corresponding to the F1 and F2 regions of the first photo mask 45 are completely removed, and the area of photoresist layer corresponding to the E region of the first photo mask 45 is partially removed, thereby its thickness being reduced.

Figure 4C:
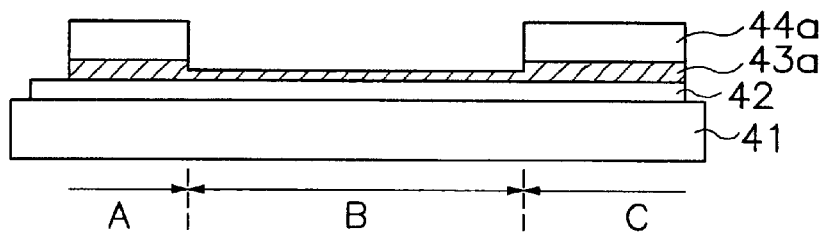

As shown in FIG. 4c, the metal layer 43 for a gate bus line is patterned according to a dry etching method using the developed first photoresist layer 44 as a barrier layer. The patterning of the metal layer 43 is so carried out that the area of the metal layer 43 corresponding to the F1 and F2 regions of the first photo mask 45 are completely removed, and the areas of the metal layer 43 corresponding the gate electrode part A and the storage capacitor electrode part C of the back substrate 41 are remained as they are, and the area of the metal layer 43 corresponding to the counter electrode part B of the back substrate 41 is partially removed. Here, the area of the metal layer 43 corresponding to the counter electrode part B of the back substrate 41 can be partially removed because the first photoresist layer 44 remains over the counter electrode part B.

Figure 4D:
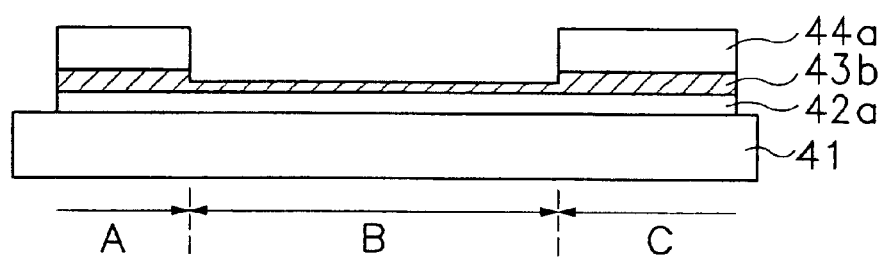

As shown in FIG. 4d, the transparent conductive layer 42 for a counter electrode is then etched using the patterned metal layer 43 as a barrier layer. The etching of the transparent conductive layer 42 is so carried out that the areas of the transparent conductive layer 42 respectively corresponding to the F1 and F2 regions of the first photo mask 45 are completely removed, and the areas of the transparent conductive layer 42 respectively corresponding to the gate electrode part A, the storage capacitor electrode part C and the counter electrode part B of the back substrate 41 are remained as they are. At this time, the area of the transparent conductive layer 42 corresponding to the counter electrode part B of the back substrate 41 can remain because the metal layer 43 for a gate bus line remains. Thus, a counter electrode 42a is formed.

Figure 4E:
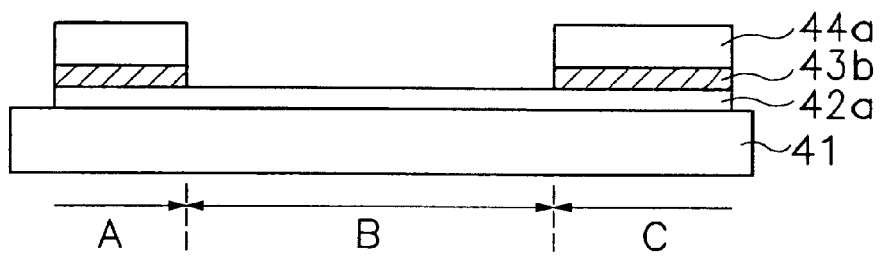

As shown in FIG. 4e, the area of the metal layer for a gate bus line corresponding to the counter electrode part B of the back substrate 41 is then removed by means of a dry etching method. Thus, a gate bus line 43b is formed.

According to the above procedures, the counter electrode 42a and the gate bus line 43b can be made in a single photolithography process. Also, a common electrode line contacting to the counter electrode 42a and a gate pad at the edges of the back substrate 41 can be made by the first photolithography process.

With reference to FIGS. 5a to 5e, the second photolithography process of the method for manufacturing the fringe field mode LCD device according to the embodiment of the present invention is described.

A gate insulating layer 54, an amorphous silicon layer 55 for a channel, a doped semiconductor layer 56 for an ohmic contact, and a metal layer 57 for source/drain electrodes are sequentially deposited on the back substrate 41 where the counter electrode 42a and the gate bus line 43b have been formed. Here, the amorphous silicon layer 55 and the doped semiconductor layer 56 are deposited by the PE-CVD method whereas the metal layers 57 for source/drain electrodes are deposited by a sputtering method. The gate insulating layer 54 may be deposited by a PE-CVD method. Where the gate insulating layer 54 is made of silicon oxides, it is preferable that it is deposited by an AP-CVD method.

Figure 5A:
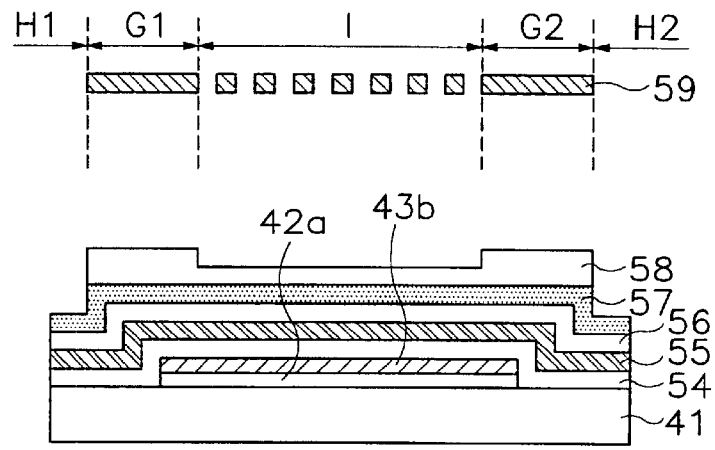
FIGS. 5a to 5e are cross-sectional views illustrating a second photolithography process involved in the method for manufacturing the fringe field mode LCD device according to an embodiment of the present invention.

A second photoresist layer 58 is coated on the metal layer 57 for source/drain electrodes, and then an exposing process is carried out using a second photo mask 59. As shown in FIG. 5a, the second photoresist layer 58 has G1 and G2 regions respectively corresponding to regions where a source electrode and a drain electrode is to be formed, an I region defined between the G1 and G2 regions, and H1 and H2 regions defined outside the G1 and G2 regions, respectively. Here, the G1 region and G2 regions are shielded so as to prevent a scanning light from transmitting therethrough, and the H1 and H2 regions are open so as to allow a scanning light to transmit through. The I region has a plurality of opening parts allowing a scanning light to pass through, and a plurality of closed parts preventing the scanning light from passing through. The opening parts and closed parts are arranged in a lattice form.

Upon developing the second photoresist layer 58 exposed to a scanning light by using the second photo mask having the above mentioned arrangement, the areas of the photoresist layer 58 respectively corresponding to the H1 and H2 regions of the second photo mask 59 are completely removed, and the area of photoresist layer 58 corresponding to the I region of the second photo mask 59 is partially removed.

Figure 5B:
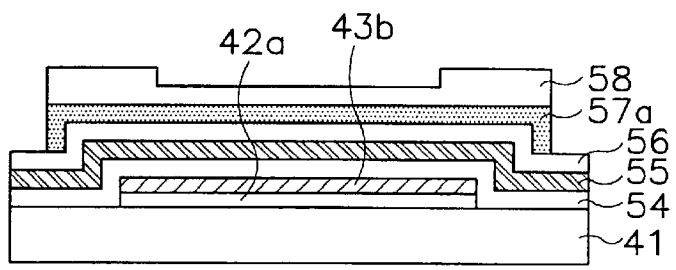

As shown in FIG. 5b, the metal layer 57 for source/drain electrodes is then patterned using the developed second photoresist layer 58 as a barrier layer. The patterning of the metal layer 57 for source/drain electrodes is so carried out that the areas of the metal layer 57 respectively corresponding to the H1 and H2 regions of the second photo mask 59 are completely removed, and the areas of the metal layer 57 respectively corresponding to the G1, G2, and I regions is remained as they are.

Figure 5C:
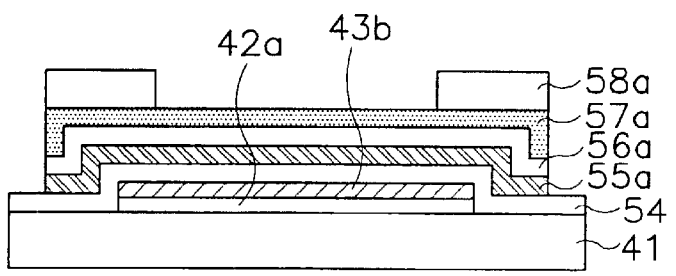

As shown in FIG. 5c, the doped semiconductor layer 56 for an ohmic contact and the amorphous silicon layer 55 for a channel are then patterned according to the dry etching method using the developed second photoresist layer 58 and the patterned metal layer 57a as barrier layers. The patterning of the doped semiconductor layer 56 and the amorphous silicon layer 55 is so carried out that the areas of the doped semiconductor layer 56 and amorphous silicon layer 55 respectively corresponding to the H1 and H2 regions of the second photo mask 59 are completely removed, and the areas of the doped semiconductor layer 56 and amorphous silicon layer 55 respectively corresponding to the G1, G2, and I regions are remained as they are. Thus, a channel 55a of the thin film transistor is constructed. Then, the area of the photoresist layer corresponding to the I region of the second photo mask 59 is removed.

Figure 5D:
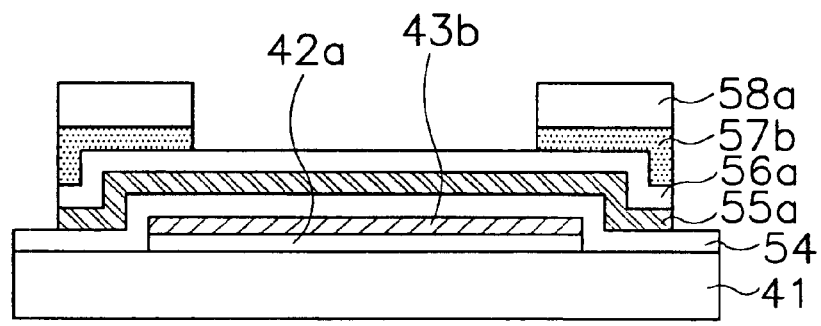

As shown in FIG. 5d, the area of the metal layer 57a for source/drain electrodes corresponding to the I region of the second photo mask 59 is then removed according to an wet etching method using the remaining second photoresist layer 58a as a barrier layer. Thus, a source electrode and a drain electrode of the thin film transistor are constructed.

Figure 5E:
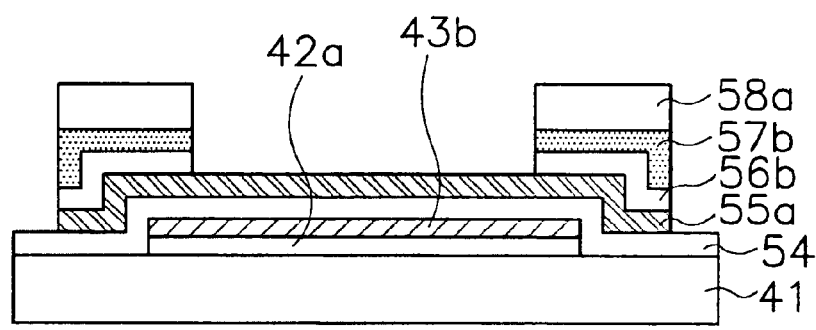

As shown in FIG. 5e, the area of the doped semiconductor layer 56a for an ohmic contact corresponding to the I region of the second photo mask 59 is then removed according to the dry etching method using the remaining second photoresist layer 58a and the metal layers 57b for source/drain electrodes as barrier layers. Thus, an ohmic contact of the source electrode and an ohmic contact of the drain electrode are constructed. Then, the remaining second photoresist layer 58a is removed.

According to the above procedures, the channel 55a of the thin film transistor, the source electrode, the drain electrode, the ohmic contact of the source electrode and the ohmic contact of the drain electrode can be made in a single photolithography process. Also, by the second photolithography process a data pad partially overlapping with the gate pad can be made at the edge of the back substrate 41.

Figure 6:
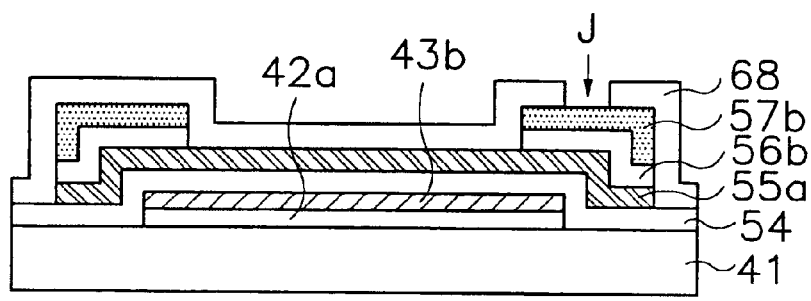
FIG. 6 is a cross-sectional view illustrating a third photolithography process involved in the method for manufacturing the fringe field mode LCD device according to an embodiment of the present invention.

With reference to FIG. 6, the third photolithography process of the method for manufacturing the fringe field mode LCD device according to the embodiment of the present invention is described. FIG. 6 is a cross-sectional view illustrating the third photolithography process of the method for manufacturing the fringe field mode LCD device according to an embodiment of the present invention.

As shown in FIG. 6, a protecting layer 68 is formed on the back substrate 41 where the source electrode and the like have been formed. The protection layer 68 then so patterned according to the fourth photolithography process that a part of the drain electrode, the data pad (not shown) and the gate pad (not shown) are exposed. At the exposed portion of the drain electrode a contact hole J is formed. The third photolithography process is carried out in the same fashion as the fifth photolithography process of the conventional method for manufacturing a fringe field mode LCD device.

Figure 7:
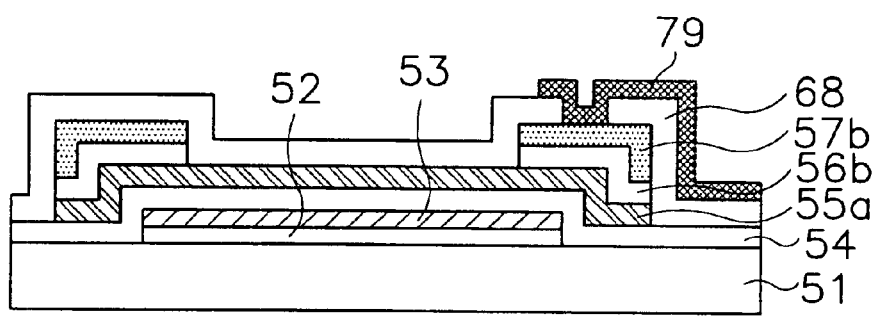
FIG. 7 is a cross-sectional view illustrating a fourth photolithography process of the method for manufacturing the fringe field mode LCD device according to an embodiment of the present invention.

Finally, with reference to FIG. 7, the fourth photolithography process of the method for manufacturing the fringe field mode LCD device according to the embodiment of the present invention is described. FIG. 7 is a cross-sectional view illustrating the fourth photolithography process of the method for manufacturing the fringe field mode LCD device according to an embodiment of the present invention.

As shown in FIG. 7, a transparent conductive layer is formed in such a fashion that it comes into contact with the exposed part of the drain electrode, the data pad and the gate pad on the protecting layer 68 where the drain electrode and the like have been exposed. It is then so patterned according to the fourth photolithography process that a comb-shaped pixel electrode 79 is formed. The fourth photolithography process is carried out in the same fashion as the sixth photolithography process of the conventional method for manufacturing a fringe field mode LCD device.

As described above, by the method for manufacturing the thin film transistor according to the embodiment of the present invention, the counter electrode and the gate bus line are formed by a single photolithography process. Also, the channel of the thin film transistor, the source electrode, the drain electrode, the ohmic contact of the source electrode, and the ohmic contact of the drain electrode are formed by a single photolithography process. Accordingly, many advantages can be achieved, including that the number of photolithography steps is reduced, thereby the manufacturing costs and time being saved, and thus the production yield being increased.

Meanwhile, the present invention is, of course, applicable to other IPS mode LCD device although the above description of the embodiment is described with reference to a fringe field mode LCD device.

Also, various other modifications will be apparent to and can be readily made by those skilled in the art without departing from the scope and spirit of this invention.

What is claimed is:

1. A method for manufacturing a thin film transistor liquid crystal display device having a back substrate, a front substrate opposed to said back substrate, a liquid crystal cell interposed between the front and back substrates, a pixel electrode formed on the back substrate, a counter electrode formed on the back substrate and adapted to cooperate with the pixel electrode to generate an electric field having a horizontal component parallel to a surface of the back substrate, and a thin film transistor including a gate electrode, a source electrode, and a drain electrode, the thin film transistor serving to apply an image signal voltage between said pixel electrode and said counter electrode, comprising the steps of:

sequentially depositing a transparent conductive layer for the counter electrode and a metal layer for the gate bus line on the back substrate;

forming a first photoresist layer on said deposited metal layer for the gate bus line;

exposing said first photoresist layer to a scanning light, so that the portion of the first photoresist layer disposed over a counter electrode region for forming said counter electrode may be partially lightened;

patterning said first photoresist layer so that an area of the metal layer for the gate bus line lying under the partially lightened portion of the first photoresist layer may not be exposed;

patterning said metal layer for the gate bus line by using said patterned first photoresist layer as a barrier layer so that said counter electrode region and a gate bus line region may be defined;

patterning said transparent conductive layer for the counter electrode by using said patterned metal layer as a barrier layer so that said counter electrode may be formed;

patterning said metal layer for the gate bus line by using said patterned first photoresist layer as a barrier layer so that said gate bus line may be formed;

forming the thin film transistor on said back substrate where said gate bus line has been formed;

forming a protecting layer on said back substrate where said thin film transistor has been formed;

patterning said protecting layer so that a part of the drain electrode included in said thin film transistor may be exposed;

forming a transparent conductive layer for the pixel electrode on said back substrate where said drain electrode has been exposed; and patterning said transparent conductive layer for the pixel electrode so that said pixel electrode may be formed.

2. The method according to claim 1, wherein said transparent conductive layer for the pixel electrode is an ITO metal layer.

3. The method according to claim 1, wherein said metal layer for the gate bus line is a metal layer capable of being patterned by a dry etching method.

4. The method according to claim 1, wherein the step of exposing said first photoresist layer is carried out using a first photo mask a portion of which corresponding to the area of said first photoresist layer located over the counter electrode region has opening parts and closed parts arranged in a lattice form.

5. The method according to claim 1, wherein:

the step of exposing said first photoresist layer to the scanning light is to expose said first photoresist layer to the scanning light so that a data pad region and a gate pad region for forming a data pad and a gate pad respectively may be defined at the edges of the back substrate;

the step of patterning said metal layer for the gate bus line is to pattern said metal layer so that the data pad and the gate pad may be formed simultaneously with the gate bus line;

the step of patterning said protecting layer is to pattern the protecting layer so that the data pad and the gate pad may be exposed; and the step of forming said transparent conductive layer for the pixel electrode comprises is to form the transparent conductive layer for the pixel electrode so as to contact with the exposed data pad and gate pad.

6. The method according to claim 1, wherein the step of forming said thin film transistor comprises the steps of:

sequentially depositing a gate insulating layer, an amorphous silicon layer for a channel, a doped semiconductor layer for an ohmic contact, and a metal layer for source/drain electrodes on the back substrate where said counter electrode and said gate bus line have been formed;

forming a second photoresist layer on said deposited metal layer for source/drain electrodes;

exposing said second photoresist layer to a scanning light so that the portion of said second photoresist layer lying over an area of the metal layer for source/drain electrodes defined between a source electrode region for forming the source electrode and a drain electrode region for forming the drain electrode may be partially lightened;

patterning said second photoresist layer so that the area of the metal layer for source/drain electrodes lying under the partially lightened portion of said second photoresist layer may not be exposed;

patterning said metal layer for source/drain electrodes by using said patterned second photoresist layer as a barrier layer so that said source electrode region and said drain electrode region may be defined;

patterning said doped semiconductor layer for the ohmic contact by using said patterned metal layer as a barrier layer so that an ohmic contact region for forming ohmic contacts for the source electrode and the drain electrode may be defined;

patterning said amorphous silicon layer for the channel by using said patterned doped semiconductor as a barrier layer so that a channel of the thin film transistor may be formed;

patterning said metal layer for source/drain electrodes by using said patterned second photoresist layer as a barrier layer so that the source electrode and drain electrode may be formed; and patterning said doped semiconductor layer for the ohmic contact by using said source electrode and the drain electrode as barrier layers so that the ohmic contacts of the source electrode and the drain electrode may be formed.

7. The method according to claim 6, wherein the step of exposing said second photoresist layer to the scanning light is carried out using a second photo mask a portion of which corresponding to an area of said second photoresist layer lying over the area of the metal layer for the source/drain electrodes defined between the source electrode region and the drain electrode region has opening parts and closed parts arranged in a lattice form.

8. The method according to claim 6, wherein said gate insulating layer, said amorphous silicon layer for the channel and said doped semiconductor layer for the ohmic contact are formed using a PE-CVD method.

9. The method according to claim 6, wherein said gate insulating layer is a silicon oxide layer deposited by an AP-CVD method.

* * * * *